Dec. 18, 1962 P. W. MORGAN 3,068,527
PROCESS FOR THE PRODUCTION OF A FIBRID SLURRY
Original Filed Jan. 22, 1959
FIG. I
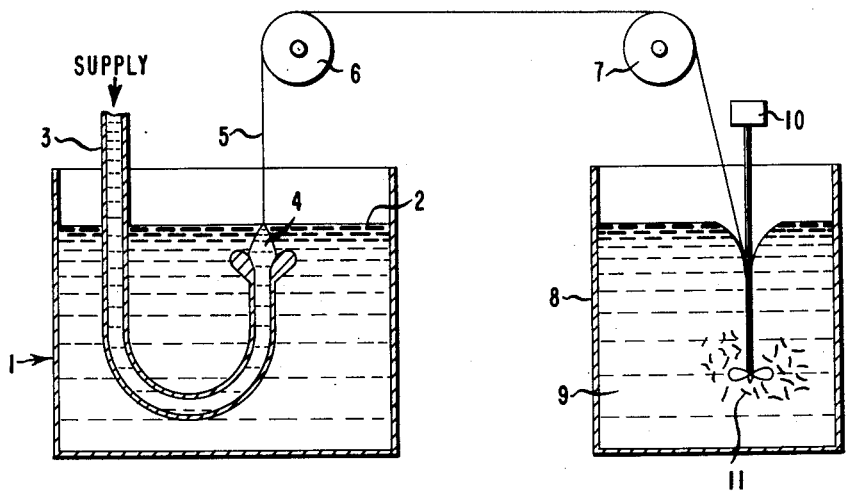
FIG. II
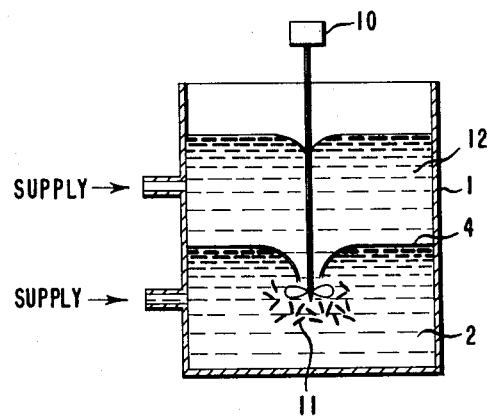
INVENTOR
PAUL WINTHROP MORGAN
BY *Carl A. Hechmer*
ATTORNEY

United States Patent Office 3,068,527
Patented Dec. 18, 1962

---

3,068,527
PROCESS FOR THE PRODUCTION OF A FIBRID SLURRY
Paul Winthrop Morgan, West Chester, Pa., assignor to E. I. du Pont de Nemours and Company, Wilmington, Del., a corporation of Delaware
Original application Jan. 22, 1959, Ser. No. 788,371, now Patent No. 2,999,788, dated Sept. 12, 1961. Divided and this application Jan. 4, 1960, Ser. No. 380
6 Claims. (Cl. 18—48)

This invention relates to a composition of matter and to a process for its production. More specifically it relates to a method of producing a novel and useful non-rigid, wholly synthetic polymeric particle as described more in detail hereinafter which is particularly useful in the production of sheet-like structures.

*Objects.*—It is an object of the present invention to provide a novel, non-rigid, wholly synthetic polymeric particle of matter capable of forming sheet-like structures on a paper-making machine.

Another object is to provide a method by which a novel, non-rigid particle of a synthetic polymer, useful in the production of non-woven structures, can be made directly from polymer intermediates.

These and other objects will become apparent in the course of the following specification and claims.

*Statement of Invention.*—The present invention provides a process for the production of a novel and useful non-rigid, wholly synthetic polymeric particle which process comprises shredding, in a liquid suspension the gel structure produced by the interfacial forming technique (U.S. Patent 2,708,617). The novel, non-rigid polymeric particle of this invention, hereinafter referred to as a "fibrid," is capable of forming paper-like structures on a paper-making machine. To be designated a "fibrid," a particle must possess (a) an ability to form a waterleaf having a couched wet tenacity of at least about 0.002 gram per denier when a plurality of the said particles is deposited from a liquid suspension upon a screen, which waterleaf, when dried at a temperature below about 50° C., has a dry tenacity at least equal to its couched wet tenacity and (b) an ability, when a plurality of the said particles is deposited concomitantly with staple fibers from a liquid suspension upon a screen, to bond a substantial weight of the said fibers by physical entwinement of the said particles with the said fibers to give a composite waterleaf with a wet tenacity of at least about 0.002 gram per denier. In addition, fibrid particles have a Canadian freeness number between 90 and 790 and a high absorptive capacity for water, retaining at least 2.0 grams of water per gram of particle under a compression load of about 39 grams per square centimeter. By "wholly synthetic polymeric" is meant that the fibrid is formed of a polymeric material synthesized by man as distinguished from a polymeric product of nature or derivative thereof.

*Fibrid Properties.*—Any normally solid wholly synthetic polymeric material may be employed in the production of fibrids. By "normally solid" is meant that the material is non-fluid under normal room conditions. By ". . . an ability to . . . bond a substantial weight of . . . (staple) fibers . . ." is meant that at least 50% by weight of staple based on total staple and fibrids can be bonded from a concomitantly deposited mixture of staple and fibrids.

It is believed that the fibrid characteristics recited above are a result of the combination of the morphology and non-rigid properties of the particle. The morphology is such that the particle is non-granular and has at least one dimension of minor magnitude relative to its largest dimension, i.e., the fibrid particle is fiber-like or film-like. Usually, in any mass of fibrids, the individual fibrid particles are not identical in shape and may include both fiber-like and film-like structures. The non-rigid characteristic of the fibrid, which renders it extremely "supple" in liquid suspension and which permits the physical entwinement described above, is presumably due to the presence of the "minor" dimension. Expressing this dimension in terms of denier, as determined in accordance with the fiber coarseness test described in Tappi 41, 175A–7A, No. 6 (June) 1958, fibrids have a denier no greater than about 15.

Complete dimensions and ranges of dimensions of such heterogeneous and odd-shaped structures are difficult to express. Even screening classifications are not always completely satisfactory to define limitations upon size since at times the individual particles become entangled with one another or wrap around the wire meshes of the screen and thereby fail to pass through the screen. Such behavior is encountered particularly in the case of fibrids made from soft (i.e., initial modulus below 0.9) polymers. Hard polymers (i.e., initial modulus above 0.9 g./denier) are more readily tested. As a general rule however, fibrid particles, when classified, according to the Clark Classification Test (Tappi 33, 294–8, No. 6 (June) 1950) are retained to the extent of not over 10% on a 10-mesh screen, and retained to the extent of at least 90% on a 200-mesh screen.

Fibrid particles are usually frazzled, have a high specific surface area, and as indicated, a high absorptive capacity for water.

Preferred fibrids are those the waterleaves of which when dried for a period of twelve hours at a temperature below the stick temperature of the polymer from which they are made (i.e., the minimum temperature at which a sample of the polymer leaves a wet molten trail as it is stroked with a moderate pressure across the smooth surface of a heated block) have a tenacity of at least about 0.005 gram per denier.

*Identification of Figures.*—The invention will be more readily understood by reference to the figures.

Figures I and II illustrate typical technique embodiments suitable for use in the process of the present invention. Each of the figures is described in greater detail below.

*Fibrid Production.*—The method for producing fibrids described and claimed in the present application consists in the beating of a liquid suspension of the wet or gel structure produced by an interfacial forming process. In the interfacial forming process an interphase polymerization is conducted between fast-reacting organic condensation polymer-forming intermediates at an interface of controlled shape between two liquid phases, each of which contains an intermediate, to form a shaped condensation polymer. The process is described in United States Patent 2,708,617. One embodiment of the process is illustrated in FIGURE I. In that figure reaction vessel 1 containing one of the fast-reacting organic condensation polymer-forming intermediates, 2, has a complementary intermediate introduced from "supply" through J tube 3, the condensation polymer forming at the interface of controlled shape 4. The gel product 5 is withdrawn continuously from the interface over guides 6 and 7 in the form of a collapsed tube, the walls of which are no greater than about 0.020 inch in thickness, described and claimed in United States Patent 2,798,283 filed December 9, 1953. The tearing or shredding operation is accomplished by leading the tubular gel filament 5, while still wet, into a vessel 8, containing liquid such as water 9, which is being violently agitated by motor driven stirrer 10. A Waring Blendor is well adapted to perform this operation. The fibrids 11 form a slurry in liquid 9. In another embodiment of the process, shown in FIGURE II, the thin film formed at the interface is shredded to the fibrid form substantially as rapidly as it forms, simply by locating stirrer 10 near interface 4 in vessel 1, which interface forms between polymer-forming intermediates 2 and 12. This technique is illustrated in Example 5 hereinafter. This process, described and claimed in the present application, is useful in preparing fibrids from any condensation polymer, either linear or cross-linked, which can be formed by interfacial forming. The gel structure is destroyed on drying of the interfacially formed structure and thereafter the structure will not form fibrids when beaten in liquid suspension as taught herein.

*Test procedures.*—The surface area of hard polymers is determined by a technique based upon the adsorption of a unimolecular layer of a gas upon the surface of the sample while it is being maintained at a temperature close to the condensation temperature of the gas. Because of the excellent bonding properties of fibrids, the surface area measurement is dependent to some extent upon the method of handling the sample prior to making the measurement. Accordingly, the following standardized procedure has been adopted. The first step is to wash the fibrids thoroughly with distilled water to remove all traces of residual solvent. It is preferable to carry out the washing on a coarse sintered glass funnel. During the washing a layer of liquid is maintained over the fibrid mat at all times until the very last wash. The vacuum is disconnected as soon as the water layer passes through the mat as this last wash is completed. The filter cake is then dried at 35° C. for at least twelve hours followed by removal of the last traces of air and liquid by heating at 50° C. for at least one hour under vacuum until a pressure as low as $10^{-3}$ mm. has been reached.

The bulb containing the evacuated sample is immersed in liquid nitrogen and a measured amount of nitrogen gas is then brought into contact with the sample. The amount adsorbed at each of a series of increasing pressures is determined. From these data the volume of adsorbed gas corresponding to the formation of a unimolecular layer of nitrogen on the sample can be deduced, and from the known molecular area of nitrogen, the specific area of the material is calculated. (See: "Scientific and Industrial Glass Blowing and Laboratory Techniques," pp. 257–283, by W. C. Barr and V. J. Anhorn, published by Instruments Publishing Company, Pittsburgh, Pennsylvania.)

Unless otherwise indicated, the strength of sheet materials prepared from "hard" polymers is determined by a modification of Tappi test T205m53 wherein the pulp slurry is poured onto a 100-mesh screen to make a sheet which is washed with 10 liters of water, removed from the screen, and dried in an oven with air maintained at approximately 100° C. One-half inch strips are cut from the sheet and strength measured on an Instron tester. The values are calculated on the basis of a one inch strip. To determine the wet strength one-half inch strips are cut from the dried sheet and placed in water, where they are soaked for 30 minutes at room temperature. The wet strength is also measured on an Instron tester and the results calcuated on the basis of a one-inch width.

The water absorption of "hard" polymers is measured by evenly distributing, without compression, a two-gram sample of the test material in a Buchner funnel (2½ inch diameter times 1³⁄₁₆ inch deep). One hundred ml. of water containing 0.1 gram of sodium lauryl sulfate is poured over the sample and allowed to drain by gravity for about 1 minute. The funnel is then connected to an overflowing reservoir so as to produce a ⅜ inch head of water in the funnel at equilibrium. When water begins to flow into the funnel a No. 11 rubber stopper weighing 67.4 grams is placed on the sample with the large face down. A two-pound weight is placed on the stopper. After ten minutes the petcock is turned to permit the sample to drain. After an additional ten minutes the sample is removed and weighed.

Freeness is determined by Tappi test T227m50. The data obtained from this test are expressed as the familiar Canadian standard freeness numbers, which represent the number of ml. of water which drain from the slurry under specified conditions.

Elmendorf tear strength is measured on the Elmendorf tear tester according to the procedure described in Tappi test T414m49. The strength recorded is the number of grams of force required to propagate a tear the remaining distance across a 63 mm. strip in which a 20 mm. standard cut has been made.

Tear factor is calculated by dividing the Elmendorf tear strength in grams by the basis weight in g./m.$^2$.

Tongue tear strength is determined in accordance with ASTM D-39.

Burst strength is measured on the Mullen burst tester according to the procedure described in Tappi test T40*m*53.

Fold endurance is determined by Tappi test T423*m*50, using the MIT Folding Endurance tester.

Elastic recovery is the percentage returned to original length within one minute after the tension has been relaxed from a sample which has been elongated 50% at the rate of 100% per minute and held at 50% elongation for one minute.

Stress decay is the per cent loss in stress in a yarn one minute after it has been elongated to 50% at the rate of 100% per minute.

Initial modulus is determined by measuring the initial slope of the stress-strain curve.

The following examples are cited to illustrate the invention. They are not intended to limit it in any manner.

*Example 1*

66 NYLON FIBRID BY BEATING INTERFACIAL STRUCTURE 25.15 ml. of an aqueous solution containing 0.2138 grams of hexamethylenediamine per ml. are mixed with 16.35 ml. of an aqueous solution containing 0.2155 grams of sodium hydroxide per ml. and the combined solution diluted to 100 ml. with water. This is carefully poured into a beaker containing 100 ml. of a carbon tetrachloride solution in which 5.88 ml. of adipyl chloride is dissolved, thereby forming two phases. A polymer film of poly(hexamethylene adipamide) i.e. "66 nylon" forms at the interface. This glm is drawn out continuously over a wet feed roller at a rate of about 18 ft./min. into a Waring Blendor in which about 200 ml. of ethyl alcohol containing 3 ml. of hydrochloric acid is being stirred rapidly. After the process is continued for 2.5 minutes the product in the Waring Blendor is collected on a Buchner funnel with a sintered glass bottom and washed well with aqueous alcohol and water.

Two such preparations, combined in 3 liters of water, are poured on an 8" x 8" 100-mesh screen in a hand sheet box, vacuum being applied as soon as the fibrids are properly suspended in the liquid in the hand sheet box. After all of the water has been removed, the sheet is blotted once on the screen. It is then removed from the screen, placed between blotters, and rolled with a steel rolling pin. After the sheet is dried on a paper dryer at 85° C. for approximately 10 minutes, it has a dry tenacity of 0.364 grams/denier at a dry elongation of 46% and a wet tenacity of 0.094 gram/denier at a wet elongation of 33%.

A slurry of the fibrids from which the sheets are made are observed to have a Canadian Standard freeness of 120. The surface area is 8.3 m.$^2$/g. A ratio of wet to dry weight of 11.9 is noted when the weight of a sheet formed on a Buchner funnel with the water just drawn out is compared with the weight of the same sheet dried to constant weight at room temperature.

Example 2

66 NYLON FIBRID BY BEATING INTERFACIAL STRUCTURE

The process of Example 1 is modified by collecting the withdrawn film in an 800 ml. beaker containing a solution of 392 ml. of ethyl alcohol and 8 ml. of concentrated hydrochloric acid. After 10 minutes the film is chopped into lengths approximately one inch long which are added to the Waring Blendor containing the solution as described in Example 1, the said blendor being operated at full speed. After 2 minutes the fibrids formed are filtered off on a fritted glass Buchner funnel.

A 1.8 gram sample of the above is washed well and suspended in approximately 3 liters of water and a sheet formed in a hand sheet box and thereafter finished as described in Example 1. The sheet has a dry tenacity of 0.255 gram/denier at a dry elongation of 27% and a wet tenacity of 0.059 gram/denier at a wet elongation of 18%. The ratio of wet to dry weight is 15.

The fibrids have a surface area of approximately 7.3 $m.^2/g$. An aqueous suspension of these fibrids has a Canadian Standard freeness of 154.

Example 3

610 POLYAMIDE FIBRID BY BEATING INTERFACIAL STRUCTURE

The technique of Example 1 is followed, using a solution of 8 ml. of sebacyl chloride ("10 acid") in 632 ml. of carbon tetrachloride as one phase and, as a second phase, a solution formed by mixing 21.62 ml. of an aqueous hexamethylenediamine ("6 amine") solution containing 0.202 gram of diamine per ml. with 15.34 ml. of an aqueous sodium hydroxide solution containing 0.196 gram of sodium hydroxide per ml., and diluting to a total volume of 94 ml. with water. The film, 610 polymer, which is formed at the interface is fed at the rate of 20 ft./min. for 5 minutes directly into the Waring Blendor containing a 50/50 mixture of ethyl alcohol and water containing 10% by weight of hydrochloric acid. When an aqueous suspension of the product is dewatered on a Buchner funnel a cohesive structure is formed.

Example 4

66 NYLON FIBRID BY BEATING INTERFACIAL STRUCTURE

Example 1 is modified to pass the film as a ropelike mass over a bobbin at 12 ft./min. into the Waring Blendor operating at about 80% of full speed. Several five gram batches of fibrids having the appearance of narrow, twisted, irregular ribbons are prepared by this procedure. This suspension has a Canadian Standard freeness of 113. A 3 gram, 8 inch square hand sheet prepared from these fibrids has a dry tenacity of 7.93 lbs./in./oz./yd.$^2$ and a maximum tongue tear of 0.187 lb./in./yd.$^2$ A hand sheet of the same size and weight is prepared from a mixture containing 50% by weight of the fibrids prepared as described above and 50% by weight of 3/8 inch, 2 d.p.f. 66 nylon [poly(hexamethylene adipamide)] staple. This sheet has a dry tenacity of 4.62 lbs./in./oz./yd.$^2$ and a maximum tongue tear of 0.557 lb./oz./yd.$^2$.

The sheet of fibrids and nylon staple is heated to a temperature of 200° C. while being pressed at about 1000 lbs./in.$^2$. A high strength (13 lbs./in./oz./yd.$^2$) sheet material having a relatively smooth surface results. The fibrids appear to have fused uniformly throughout the sheet product.

As exemplified above the interfacial spinning technique produces a structure which can be shredded to form fibrids. Interfacial spinning broadly considered involves bringing a liquid phase comprising one condensation polymer-forming intermediate (e.g., a liquid organic diamine or solution of an organic diamine) and another liquid phase comprising a coreacting polymer-forming intermediate (e.g., a solution of an organic dicarboxylic acid halide) together to form a liquid-liquid interface, controlling the shape of the interface until a shaped polymer has formed, and then withdrawing the polymer from the interface. Preferably, the polymer is withdrawn continuously from the interface as a continuous self-supporting film or filament. Tearing or shredding is preferably performed upon the freshly-made shaped structure. This is conveniently done by leading the film or fiber directly into a suitable shredder, as shown in Examples 1 and 3. Alternatively the interfacially spun structure may be collected and stored in the wet state between the spinning and shredding operation, as shown in Example 2. Another suitable procedure is to withdraw the film formed at the interface in consecutive batches, which are then shredded or beaten, rather than to remove the interfacially-formed structure continuously. When operating in this manner the interfacially-formed film may be gently agitated to increase its thickness and thereafter shredded in a liquid suspension. In another modification of this process, the thin film formed at the interface is shredded to the fibrid form substantially as rapidly as it forms. Agitation is controlled to avoid dispersing one reactant-containing phase in the other prior to formation of the interfacial film. Suitable conditions are described in Example 5 below.

Example 5

66 NYLON FIBRID BY BEATING INTERFACIAL STRUCTURE 200 ml. of an aqueous solution containing 9.27 grams hexamethylene diamine and 6.4 grams sodium hydroxide are placed in a Waring Blendor jar. The blendor is started at half speed to permit formation of an interfacial film and 11.76 ml. of adipyl chloride dissolved in 400 ml. of carbon tetrachloride is added through a powder funnel inserted in the cover. The addition is made rapidly and the mass of forming polymer stops the stirrer almost immediately. The blades are freed of the product with a spatula and stirring of the mass is continued for 3 minutes producing the fibrid product.

The product is isolated and washed thoroughly with alcohol and water. The particles are of a twisted, ragged and branched filmy structure. Strong sheets are prepared by drawing down the dispersion of particles on a sintered glass funnel and drying the mat. The inherent viscosity of the polymer is 0.80 (m-cresol at 30° C. and 0.5 gram polymer/100 ml. solution).

It is necessary, both to facilitate shredding and to obtain high strength in sheet products, that the interfacially-spun structure be in a highly-swollen condition when it is shredded. This is accomplished by beating without intermediate drying.

The interfacially-formed structure is shredded while suspended in a non-solvent liquid. Suitable shredding or shearing media include water, glycerol, ethylene glycol, acetone, ether, alcohol, etc. A choice of liquid is dependent upon the nature of the interfacially-formed structure. Aqueous organic liquid mixtures, such as water-glycerol or water-ethylene glycol mixtures, are useful in the process. Water alone is particularly desirable for economic reasons and works quite satisfactorily in many cases. Non-aqueous media are sometimes desirable, however, particularly to retard crystallization of the polymer as it is shaped. A relatively wide range of viscosities may be tolerated in the shearing medium.

Shredding of the interfacially-formed structures suspended in the liquid is conveniently performed by turbulent agitation. The design of the stirrer blade used in the Waring Blendor has been found to be particularly satisfactory. Shredding action can be increased by introducing suitable baffles in the mixing vessel, for instance, as used in the commercial mixing devices of the Waring Blendor type. Other types of apparatus, such as disc mills, Jordan refiners, and the like, are suitable.

For a device to be suitable for use in this process, it is necessary that it be capable of tearing or shredding the gel structure in the liquid medium to produce fibrous structures with a minimum surface area of above about 4.5 m.$^2$/g. The mechanical action required to produce this is, of course, dependent to some extent upon the gel swelling factor and the physical form of the polymer mass to which the shear is applied.

The shredding process forms a slurry of heterogeneous fibrids. The Canadian Standard freeness numbers of aqueous slurries of the fibrids obtained by shredding are below about 750 and the preferred products of this invention have freeness numbers in the range between about 150 and 500. The freeness and many other characteristics of these slurries are similar to those of cellulose pulps used for making paper. They are, therefore, of particular utility in the manufacture of sheet-like products on paper-making equipment. As shown in the examples above, these sheet-like structures can be made from the fibrids alone or may be formed from a mixture of fibrids and staple. The fibrids bond together to form coherent sheets when settled from liquid suspension, for instance, on a screen. Where mixtures of staple and fibrids are deposited, their wet sheets can be handled. When such sheets, after drying, are subjected to heat and pressure the fibrids may be fused, as shown in Example 4. In this way a very strong and uniform sheet can be produced.

*Fibrid Sheets.*—As shown in the previous examples an important characteristic of fibrids is their cohesiveness or bonding strength in sheet products. This is quite evident in both wet and dry sheets, particularly when the sheets are compared with the products of the prior art. For example, the wet tenacity of sheets prepared from staple fibers is usually less than $4 \times 10^{-4}$ gram/denier. In contrast to this, sheets prepared from "hard" polymer fibrids have a minimum couched wet tenacity of about 0.002 gram/denier, and frequently have minimum dry strength, before pressing, of about 0.01 gram/denier. A wet strength of as high as 0.02 gram/denier is not unusual for these products. The values expressed in grams/denier may be converted to values expressed as lbs./in./oz./yd.$^2$ by multiplying by 17.

*Polymers.*—Suitable polymers include polyamides, such as poly(hexamethylene adipamide), poly(ethylene sebacamide), poly(methylene bis (polycyclohexylene) adipamide), polycaprolactam, and copolyamides, such as those formed from a mixture of hexamethylenediamine, adipic acid, and sebacic acid, or by a mixture of caprolactam, hexamethylenediamine, and adipic acid; polyurethanes; polyureas, polyesters, such as poly(ethylene terephthalate); polythiolesters; polysulfonamides; and many others. Copolymers of all types may be used. Derivatives of the polymers are also suitable.

Many types of condensation elastomers are also suitable. United States Patent No. 2,670,267 describes N-alkyl-substituted copolyamides which are highly elastic and have a suitable low modulus. A copolyamide of this type, obtained by reacting adipic acid with a mixture of hexamethylenediamine, N-isobutylhexamethylenediamine, and N.N'-isobutylhexamethylenediamine produces an elastomer which is particularly satisfactory for the purposes of this invention.

*Freeness Numbers.*—The freeness numbers of aqueous slurries of fibrids is below about 790. The preferred fibrids from "hard" polymers have freeness numbers in the range between about 100 and about 600. The preferred products from "soft" polymers have freeness in the range between about 400 and about 700.

The freeness and many other characteristics of fibrid slurries are similar to those of cellulose pulps used for making paper. The primary distinction is that the slurries are prepared from synthetic polymers. Accordingly, they may be thought of as synthetic "pulps." The properties of the fibrid slurries may be modified by mixing with them a slurry of fibrids from other polymers and/or by mixing with synthetic fiber staple or chopped synthetic fibers, and/or by mixing with rayon staple or staple from cellulose derivatives, and/or by mixing with beaten cellulose and/or natural animal fibers and/or mineral fibers. Many other methods of modifying these slurries are mentioned elsewhere.

*Isolation of Fibrids.*—If it is desired, the fibrids prepared from hard polymers may be isolated and dried. The drying conditions required for retention of adequate bonding properties in sheet formation on a papermaking machine are not particularly critical, although it is preferable that these conditions not be drastic. For example, the temperature should be kept low enough to avoid fusing the fibrids into globular masses, since the bonding properties associated with these products would be lost. Also, severe mechanical action should be avoided, since this would tend to break up the fibrids into fines. More care in drying fibrids is required if it is desired that they have bonding properties when redispersed in water identical with those which they possessed prior to drying.

One method of drying which has been found suitable for preparing dried fibrids with adequate bonding properties is to spray-dry a slurry under controlled conditions, e.g., the temperature should not be too close to the melting point and the slurry which is sprayed should be substantially free of solvent for the polymer. A second method is to wash the fibrids with a water-miscible low-boiling organic solvent. The water-miscibility requirement is based on the assumption that the fibrids have been deposited from an aqueous slurry and are still wet.

Another suitable method comprises removing water in a centrifuge until the moisture content has been reduced to approximately 100%. The fibrids are then placed in a cone with an air inlet at the apex. Air is admitted at approximately 9 cu. ft./min. to circulate the fibrids. After approximately three minutes the moisture content is reduced to about 50%. The fluffed fibrids are then transferred to an air oven where the moisture content is reduced to approximately 1% by circulating heated air; temperatures in the region of 100° C. are usually suitable.

*Redispersion of Fibrids.*—The dried fibrids prepared from "hard" polymers can be redispersed in aqueous media, from which can be made sheet products with substantially the same properties possessed by sheets prepared directly from the original slurry. Redispersing is usually carried out in an apparatus such as the Hollander beater and is aided by the use of wetting agents. The processing economies of preparing the sheet products from the original aqueous slurry are obvious, and this is naturally the preferred method of operation wherever feasible. However, since it may frequently be necessary to ship the fibrids from the location where they are prepared to another location, where they will be converted to sheet products, it is a definite advantage to be able to dry the products to reduce shipping costs.

*Fibrid Sheets.*—An important characteristic of fibrids is their cohesiveness or bonding strength in sheet products. This is quite evident in both wet and dry homosheets. Sheets prepared from "soft" polymer fibrids have a minimum couched wet strength of approximately 0.002 g.p.d. and a minimum dry strength, before pressing, of approximately 0.005 g.p.d. This exists despite a low level of mechanical properties characteristic of the polymers per se, when compared to hard polymers. One characteristic of these sheets, which distinguishes them from homosheet products prepared from hard polymer fibrids is their behavior on rewetting after drying. The sheets from soft polymer fibrids retain a substantial percentage of the dry strength whereas the upressed, unfused homosheets prepared from hard polymer fibrids drop back more nearly to a strength level of the original wet sheet, a value which is frequently appreciably lower than the dry strength. The wet tenacity of sheets prepared from staple fibers is usually less than $4 \times 10^{-4}$ gram/denier. Sheets prepared from "hard" polymer fibrids have a minimum couched wet tenacity of about 0.002 gram/denier and a minimum dry strength before pressing of about 0.005 gram/denier. A wet strength of as high as 0.02 gram/denier is not unusual for these products. Values expressed as gram/denier may be converted to values expressed as lbs./in./oz./yd.$^2$ by multiplying by 17.

By virtue of their special characteristics, fibrids disperse readily to form stable dispersions which may be used in ordinary papermaking operations without adding surfactants. This permits the use of fibrids in papermaking machinery without modification of the usual processing conditions, and serves to distinguish fibrids from any previously known fiber form of synthetic polymer. Thus, fibrids may be added to the beater and passed through the refiner into the head box onto the screen of a Four-drinier machine. From there the sheet may be carried to the wet press through drier rolls, calenders, and woundup as a sheet without modifying the normal operating characteristics of the machines as used for making cellulose paper. In addition, the papermaking operation can be integrated with fibrid manufacture by collecting the fibrid on a screen at the exit from the precipitation zone. It is also possible to form shaped articles directly from thick fibrid slurries by slush-molding in patterns or molds.

The advantages of these fibrids in the formation of sheet products becomes more apparent when sheet products from hard polymers are compared to those from synthetic polymers in the fiber forms prepared by prior art processes.

*Table XVI*

| Fiber form | Surface area [1] | Freeness | Wet Sheet [2] strength unpress. unfused fibers |
|---|---|---|---|
| Hard Polymer Fibrids. | above 2.0 | below 790 | above 0.002. |
| Microfibers [3] | approximately 1.0. | above 800 | Aqueous slurries and sheets very difficult to form. |
| Air Jetted Fibers [4] | 0.5 | ---do------ | Do. |
| Fibers From Fibrilatable Films. | 1.1 | ---do------ | $4 \times 10^{-4}$. |
| Staple | less than 0.5 | ---do------ | No greater than 0.001. |

[1] M.$^2$/g.
[2] G.p.d.
[3] Fine, round, dense fibers with a diameter of approximately two microns or less.
[4] Equivalent to those described in U.S. 2,483,405.

An important feature of the bonding properties of fibrids is that no heat or pressure is required to develop adequate strength. The geometry of the sheet is determined primarily by the form in which it is held while being dried at room temperature. The strength of sheet products comprising soft polymer fibrids can be increased by heating alone. This is also true to a lesser extent for products comprising hard polymer fibrids, but for these products maximum strength is usually attained by the combination of heat and pressure.

Pressure rolls and solvent treatments, applied as known in the art, generally tend to produce stiffer, less porous sheets. Engraved rolls can be used to produce patterns on these sheets, for example, by forming translucent areas in an opaque background. Another way of introducing a texture or pattern on the sheet is to pass it through a calender which has one roll surfaced with heated fine needles or spikes. Such a treatment may also serve to increase the bonding.

*Fibrid-Bonded Products.*—When using fibrids as a binder in sheet formation, as little as about 1% fibrids in the final sheet is often highly advantageous. Generally, however, it is preferred to use at least about 5% of the fibrid and at least about 15% fibrid is preferred for maximum strength.

The hand and other properties of sheet products prepared from hard and/or soft fibrids can be controlled and modified in many ways. One very practical method of accomplishing this is to blend the fibrids of this invention with staple fibers. These staple fibers may be derived from cellulosic materials, staple of synthetic polymers, or staple fibers of natural origin. The combination of fibrids with staple generally results in a sheet with higher tear strength. Within this area the properties can be controlled or modified by the choice of polymer for preparing the fibrids, the choice of staple fiber composition and/or length and/or denier.

The properties of fibrid-bonded sheets, whether they be homosheets (i.e., all fibrid) or heterosheets, i.e., sheets from mixtures of fibers and staple, may be controlled or modified by calendering or heating. For example, fibrid homosheets may be made paper-like by calendering alone. A wide variety of products may be made by the use of a combination of heat and pressure. The properties obtained are controlled by the amount and type (dead load or calender) of pressure applied, calendering temperature, and the like.

*Utility.*—Products bonded with fibrids have many applications. One of these is in the form of elastic apparel. Such applications include outerwear garments such as jackets, coats, skirts, playsuits, under water suits, rainwear, gloves, watch straps, and in certain shoe applications, such as in house slippers, foot-wear-uppers, and boot and shoe liners. Other apparel and personal items include girdles, elastic fabrics for anklets, wristlets, waistbands, and sweatbands, handbags, sleeping bags, and elastic medical materials, such as surgical and medical bandages. Household uses include antiskid mats, such as rug anchors and tub mats, blankets, shower curtains, and protective covers for such items as coasters, bottles, drinking glasses, luggage, lamp shades, and the bases of lamps, statues, and silver. Further applications are in wall covering, draperies, and in coated fabrics. They may be used in the manufacture of books, such as in book binding or covering whether it be the only cover or as a protective cover for hard-bound books. In connection with applications such as this, it is interesting to note that sheet products made from certain of the elastomer fibrids are heat-sealable. Use as flannel replacements, such as in apparel, pool table covers, and phonographic turn table covers is suggested by the properties of the sheet products. They may be used as linings or inserts, such as fabric interliners, linings for a variety of cases such as those used for scientific instruments, jewelry, musical instruments, etc.

Sheet products prepared from hard polymer fibrids, or combinations of these fibrids with hard polymer staple, have properties which suggest many possible uses. Thus, the good dimensional stability, excellent resistance to acids and alkalies, relatively low water absorption, good wet strength properties, and resistance to attack by fungus and mold suggest their use in non-woven products utilized in such applications as light weight tarpaulins and tentage material. Other applications outside the usual paper and tape uses are as paper drapes and curtains, bases for coated fabrics, abrasive backings, diaphrgm reinforcements, book covers, both as the sole backing or as covers for other types of book bindings. As an example of a variety of protective cover applications may be mentioned covers for military equipment which is being stored.

An important application for paper-like products is in the field of bagging, particularly for heavy industrial uses. However, additional specific uses are as vacuum cleaner bags, shoot bags for pollenation control, sleeping bags, and tea bags.

Other industrial applications include electrical insulation, transformer press boards, and as wrappings for underground pipes. They may also be used as wrappings for food products, such as meat and cheese. Additional applications include filter media, such as filter papers, fuel cells and mold release materials.

Sheet products comprising these fibrids are also ideally suited for use as headliners in automobiles, interliners for non-woven fabrics, and reinforcing agents for rubber goods, such as belting and tires. Fabric-like sheets of a cashmere or suede type are formed by brushing a nap on a sheet containing fibrids from either hard or soft polymer.

Many equivalent modifications will be apparent to those skilled in the art from a reading of the above without a departure from the inventive concept.

This application is a division of United States application 788,371, filed January 22, 1959, now Patent No. 2,999,788.

What is claimed is:

1. A process for the production of a fibrid slurry which comprises the steps of forming a shaped gel structure of an organic condensation polymer by an interphase polymerization between fast-reacting organic condensation polymer-forming intermediates at an interface of controlled shape between two liquid phases, each of which contains an intermediate and beating a liquid suspension of the shaped structure so formed prior to drying the said shaped structure.

2. The process of claim wherein the interfacially spun product in the form of a collapsed tube is continuously led from its interfacial spinning device to a shredding liquid.

3. The process of claim 2 wherein the said shredding liquid is water.

4. The process of claim 1 wherein the said interfacially formed structure is a polyamide.

5. The process of claim 4 wherein the said polyamide is polyhexamethylene adipamide.

6. The process of claim 4 wherein the said polyamide is polyhexamethylene sebacamide.

References Cited in the file of this patent

UNITED STATES PATENTS

| | | |
|---|---|---|
| 2,708,617 | Magat | May 17, 1955 |
| 2,798,283 | Magat | July 9, 1957 |
| 2,810,646 | Wooding | Oct. 22, 1957 |
| 2,954,587 | Rasmussen | Oct. 4, 1960 |

FOREIGN PATENTS

| | | |
|---|---|---|
| 552,682 | Great Britain | Apr. 20, 1943 |